2 Sheets—Sheet 1.

W. C. DURANT

Coal Stove.

No. 3,426.

Reissued May 11, 1869

WITNESSES

Austin F. Park

John I. Savage

INVENTOR

Wm. C. Durant

2 Sheets—Sheet 2.

W. C. DURANT.

Coal Stove.

No. 3,426.

Reissued May 11, 1869.

WITNESSES.
Austin F. Park
John J. Savage

INVENTOR
Wm. C. Durant

UNITED STATES PATENT OFFICE.

WILLIAM C. DURANT, OF WEST TROY, NEW YORK.

IMPROVEMENT IN BASE-BURNING STOVES.

Specification forming part of Letters Patent No. 66,957, dated July 23, 1867; Reissue No. 3,426, dated May 11, 1869.

*To all whom it may concern:*

Be it known that I, WILLIAM C. DURANT, of West Troy, in the county of Albany and State of New York, have invented certain new and useful Improvements in Coal-Stoves; and I do hereby declare that the following is a full, clear, and exact description thereof, which will enable others skilled in the art to make and use the same, reference being had to the accompanying drawings, forming part of this specification, in which—

Figure 1:
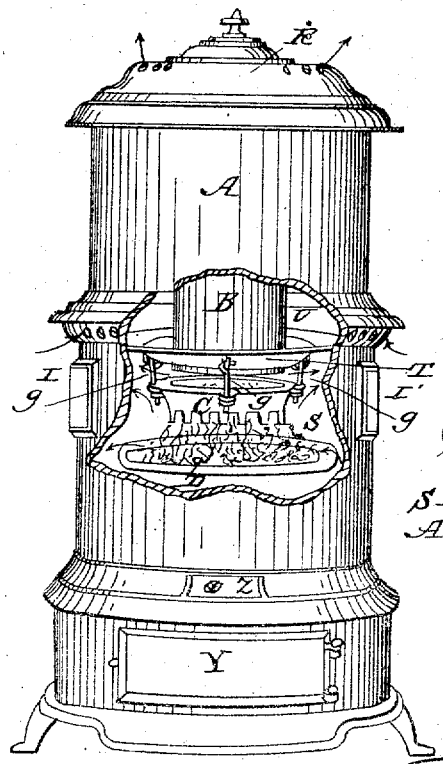
Figure 6:
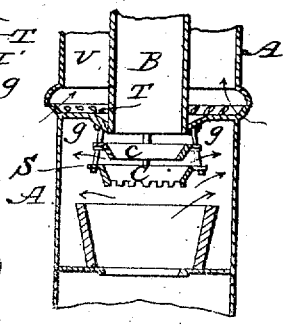
Figure 4:
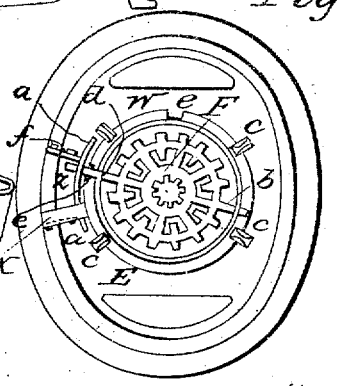
Figure 5:
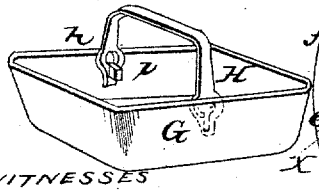
Figure 2:
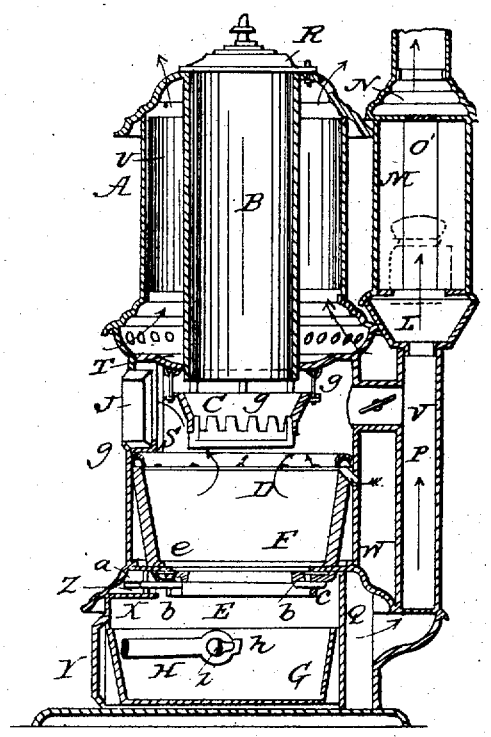
Figure 3:
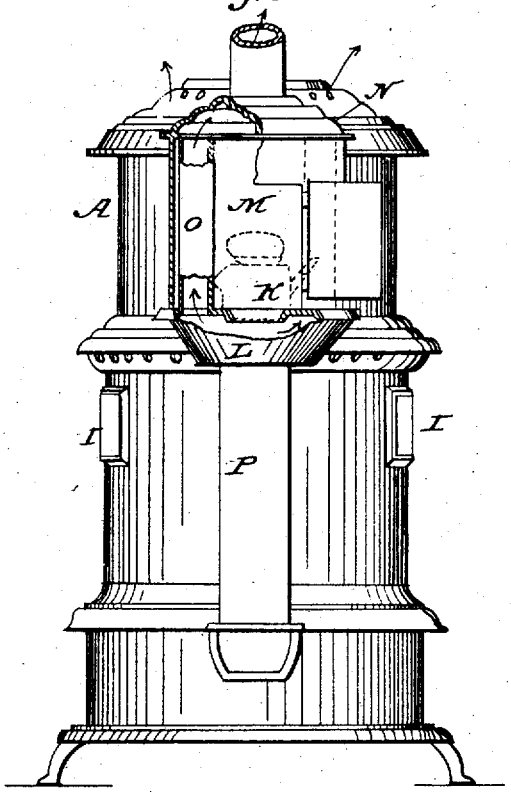

Figure 1 is a front view of a stove, a part of the front or outer plates being removed to show the deflector mouth-piece and the fuel-magazine. Fig. 2 is a vertical sectional view of the same. Fig. 3 is a rear view, partly in section, of the same, showing an attached boiler-plate and oven. Fig. 4 is a plan view of the under side of the fire-pot base-plate, showing the manner of suspending the fire-grate and its bed-plate. Fig. 5 is a perspective view of a portable ash draw or pan with an improved bail; and Fig. 6 shows a compound deflector mouth-piece.

The same letters refer to like parts in each of said figures.

This invention relates to various improvements in parlor and other upright stoves.

The first part of my invention consists in a deflector-feeder or mouth-piece, in combination with a magazine or fuel-supply chamber of stoves, said mouth-piece or feeder being arranged below and near to the throat or base of said magazine, in manner substantially as hereinafter described. This deflector mouth-piece is for the purpose of and operates to prevent all gases rising toward the fuel-reservoir from entering the same by deflecting them outward from its throat or base toward air-orifices, where, mixing with air, they are consumed, and the products of combustion pass off through the lateral diving-flues of the stove, thereby preventing collections of gases and products of combustion within said fuel-magazine.

The second part of my invention consists in the improved manner of hanging or suspending the fire-grate bed-plate ring to the under side of the fire-pot base-plate, by the combined means of hook-headed pendent lugs or brackets cast on or affixed to said fire-pot base-plate, and by notches or recesses made in the flange of the bed-plate in such respective positions therein as to coincide with the respective positions of said hooks or lugs on said base-plate, whereby said bed-plate with its grate is easily and quickly slipped into its proper position for admitting of vibratory or shaking movement in horizontal directions about its center, and with like ease it is displaced therefrom whenever necessary for purposes of repairs, substantially in manner as hereinafter described.

The third part of my invention consists in the employment, with the fire-grate, of a bed-plate having a horizontal vibratory movement about its center, in combination with a vibratory moving plate, connecting the operating-journal of said grate with the back part of a close pocket or recess made in the ash-pit, and covering or partitioning said journal end from the ash-pit, in manner substantially as hereinafter described. This improvement enables said fire-grate to be shaken in horizontal directions about its center and tilted or dumped. While so doing no ashes or dust can escape therefrom through said operating-journal pocket into the room.

The fourth part of my invention consists in the construction of a bail for a portable ash-pan, in manner substantially as hereinafter described, whereby the ash-pan, when carried by said bail, causes the same to take a fixed, immovable position on its lugs, in a manner that prevents the ash-pan from tipping or upsetting to spill ashes therefrom.

The fifth part of my invention consists in the application of an extension-chamber, whose top forms a heating-plate, to the smoke pipe or flue of an upright stove, so that boilers or other vessels containing substances to be warmed may be conveniently placed upon the top plate of said extension-chamber; also, in forming an oven upon said extension-chamber, if desired.

To enable others skilled in the art to make and use my said invention, I now proceed to fully describe its construction and operation.

Fig. 1 represents a fuel-magazine or reservoir-stove for heating purposes, the same having an ash-pit, Y, fire-pot D, combustion or flame chamber S, cylindrical magazine B, and hot-air chamber U, of the usual or suitable form and manner of construction. A diaphragm or partition plate, T, divides the flame-chamber S from the hot-air chamber U, and it also stays and supports the base or throat of the fuel-magazine B.

C, in Figs. 1 and 2, shows a deflector feeder or mouth-piece. Its external face or deflecting sides are funnel-shaped, or so formed as to make an angle of thirty to forty degrees, or thereabout, from a perpendicular, so as to deflect rising heat and gases away from the magazine-throat, in manner as hereinafter described. This deflector mouth-piece is arranged at a distance of some three inches, or thereabout, below the base or throat of the magazine B, and so as to act in combination therewith. It is retained or suspended in such position thereto by links or rods *g*, which are attached to projecting ears or lugs on said mouth-piece C, and which have their top ends hooked to loops on the under side of the partition-plate T, said plate being depressed or sunk in its central part, encircling the magazine, so as to form of its central under surface a deflector-surface, substantially as shown. This device C constitutes what I term a "single" deflector mouth-piece, and it is employed in those stoves having but ordinary dimensions, or a comparative shallowness in depth of flame-chamber, for which it is well adapted, and produces good practical results; but in stoves wherein more than the usual height of flame-chamber or space between the fire-pot and division-plate T is wanted and used, then I employ what I term a "compound" deflector mouth-piece, substantially the same as shown in Fig. 6 of annexed drawing, wherein two or more, if necessary, of said single deflector mouth-pieces are attached together by means of links, and the compound set thus connected is then arranged in combined position with the base or throat of the fuel-magazine B, and suspended in such position thereto by means of links connecting with the loops on the partition-plate T, in manner as before mentioned.

The operation or action of this deflector mouth-piece, if thus substantially constructed and combined with the base or throat of a fuel-supply magazine, is as follows: The magazine being filled with fuel and the fire-pot in full operation, the combustible gases and hot products of combustion rising under said deflector mouth-piece, in their ascent impinge on the inclined faces of said mouth-piece, which deflects them outward toward the outer parts of the flame-chamber, as shown by the arrows in the drawing, and said deflected currents draw with and after them the gases rising from or generated at and below the central parts of said mouth-piece, so that no gases rise into or collect within the fuel-magazine, which, together with the admission of cold air to circulate around its outer sides, keeps said magazine sufficiently cool to prevent heating the fuel in its upper parts, thereby preventing all noxious fumes from being generated therein to escape therefrom.

E is a bed-plate for supporting the fire-grate F. This bed-plate is of a ring form, with outward flange from its upper edge.

W is the fire-pot base-plate. To the under side of this plate are affixed or formed hook-headed lugs or brackets *c*. The bed-plate E, by means of the notches or recesses *c* in its flange, and arranged in such respective positions therein as to coincide with the respective positions of said hooks or brackets *c* on said base-plate, is, by such means, slipped easily and quickly within said hooks *c*. The bed-plate is then turned until the said notches *c* are carried past the hooks a sufficient distance to allow a proper range of motion without bringing the said hooks and notches to coincide, so that it is suspended in proper position by its flange upon said hooks or lugs, and has a vibratory or shaking movement upon said hooks horizontally about its center when desired. The fire-grate F is suspended in proper position within this bed-plate E, the short journal having its bearing directly in the bed-plate rim in a notch made in its upper side, while the long or operating shank or journal *b* passes through a notch in the under side of the bed-plate, and has its bearing in a vibratory horizontally-movable plate, *a*, and its square end passes through said plate into a recess or pocket, *z*, of which said plate *a* forms a close back side. *x* is the bottom plate, and *f f* the end plates, of said pockets *z*, they forming a close partition between the operating-journal end and the ash-pit, the front and top opening of said pocket being closed by a door or lid. This combination of movable bed-plate and fire-grate with a close-pocket movable plate covering the operating-journal end from the ash-pit, as described, prevents the escape of dust and ashes from the ash-pit while dumping or shaking said grate to clean the same.

G is a portable ash-pan, having its position under the grate and within the ash-pit Y. To the right and left inside walls of this pan, attached to or cast thereon, are square or parallel faced or angular-sided carrying-lugs *i*. H is a bail, having an eyehole at each end sufficiently large to easily slip over and turn down and up on said lugs. At the bottom part of these respective eyeholes is made a slot or notch, *h*, of a form and size to fit on and hug the said square or angular lugs *i*, which prevents the ash-pan from rocking when the bail is turned upright and the pan lifted and carried by it, thereby preventing the ash-pan from overturning, so as to spill ashes therefrom.

At any suitable part of the exit or smoke pipe F, or just above that part of said pipe where the same connects with the direct-draft flue V, is arranged on the said pipe F an enlargement or flue-chamber, L, which is covered by a plate, K, upon which vessels for the purpose of heating or boiling their contents may be placed. At each end of the plate K is or may be a pipe-hole, which may receive, respectively, a branch exit-pipe, *o* and *o'*. At the top of these branch pipes and supported by them is or may be placed the top flue-chamber N, into which said branch exit-pipes conduct the smoke and products of combustion from the exit-pipe P below, and from thence said products of combustion escape through the top main exit-pipe into the chimney.

The open space between the plate K and the flue-chamber N is or may be inclosed by an iron casing, provided with an opening and with a closing door, thereby forming, in connection with said plate and with the bottom of the flue-chamber N, a useful oven, *m*, in manner substantially as shown in the drawings. The enlargement L and the arrangement of smoke-pipes may, however, be of any other equivalent construction, as long as on the smoke-pipe or exit-flue of an upright stove a chamber is formed upon which articles to be heated may be placed.

Having thus described my invention, I claim as new and desire to secure by Letters Patent—

1. In combination with a fuel-magazine, B, of stoves, a deflector mouth-piece, C, either of a single or compound form of construction, substantially as herein described, and arranged to operate as and for the purpose set forth.

2. The combination of hook-headed pendent lugs or brackets *c* on the fire-pot base-plate W with the respectively-located coinciding notches or recesses *e* in the flange of the bed-plate ring E, substantially as described, for the purpose of easily and quickly mounting or hanging said bed-plate ring with its fire-grate in operating position, as set forth.

3. The combination of the dumping fire grate with an under suspended and horizontally vibrating or shaking bed-plate, and with a lever operating them, when said fire-grate can be dumped, but not vibrated, independent of the bed-plate, substantially as and for the purpose set forth.

4. In combination with a horizontally-vibrating grate and bed-plate, and with a lever for shaking them, the terminating of the end of the journal or shank by which they are vibrated in a pocket, *z*, so that said shank shall not project beyond the exterior of the stove, but be accessible and operated from the outside by the shaker through a suitable opening in said exterior, substantially as and for the purpose described.

5. Arranging a boiler-plate, with or without the oven, on the exit-flue of a base-burning stove, substantially as described, for the purpose specified.

WM. C. DURANT.

Witnesses:
WM. BURWELL,
H. M. BARNES.